United States Patent [19]

Beffa

[11] 4,256,633
[45] Mar. 17, 1981

[54] CHROMIUM COMPLEX COMPOUNDS, PROCESS FOR THEIR MANUFACTURE AND USE THEREOF

[75] Inventor: Fabio Beffa, Riehen, Switzerland

[73] Assignee: Ciba-Geigy Corporation, Ardsley, N.Y.

[21] Appl. No.: 30,413

[22] Filed: Apr. 16, 1979

[30] Foreign Application Priority Data

Apr. 25, 1978 [CH] Switzerland .................. 44482/78
Dec. 5, 1978 [CH] Switzerland .................. 123965/78

[51] Int. Cl.³ ........................................... C09B 45/26
[52] U.S. Cl. .......................... 260/145 C; 260/145 R; 260/145 A; 260/145 B; 260/148
[58] Field of Search ........... 260/145 R, 145 A, 145 C, 260/145 B, 148

[56] References Cited

U.S. PATENT DOCUMENTS

| | | |
|---|---|---|
| 3,562,246 | 2/1971 | Barwick et al. ............ 260/145 A |
| 3,756,771 | 9/1973 | Beffa ......................... 260/145 A |
| 3,879,336 | 4/1975 | Maeda et al. ............... 260/145 A |
| 3,975,369 | 8/1976 | Wicki ........................ 260/145 A |
| 4,150,942 | 4/1979 | Holliger et al. ............. 260/145 A |
| 4,158,003 | 6/1979 | Bitterlin et al. ............. 260/148 |

*Primary Examiner*—Arthur P. Demers

*Attorney, Agent, or Firm*—Edward McC. Roberts

[57] ABSTRACT

Bis-1:2 chromium complex dyes consisting of 2-chromium atoms, 2 molecules of a metallizable azo or azomethine compound and a bisazomethine of the formula

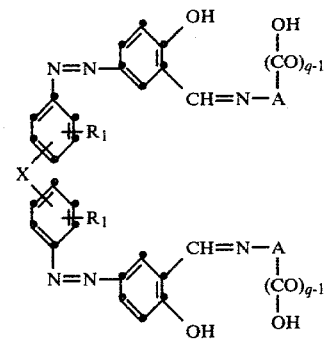

wherein X is a direct bond or a bridge member, $R_1$ is hydrogen or a substituent, and A is a benzene or naphthalene radical or a substituted or unsubstituted aliphatic or cycloaliphatic radical.

11 Claims, No Drawings

CHROMIUM COMPLEX COMPOUNDS, PROCESS FOR THEIR MANUFACTURE AND USE THEREOF

The present invention relates to chromium complex compounds which, in the form of the free acid, have the formula

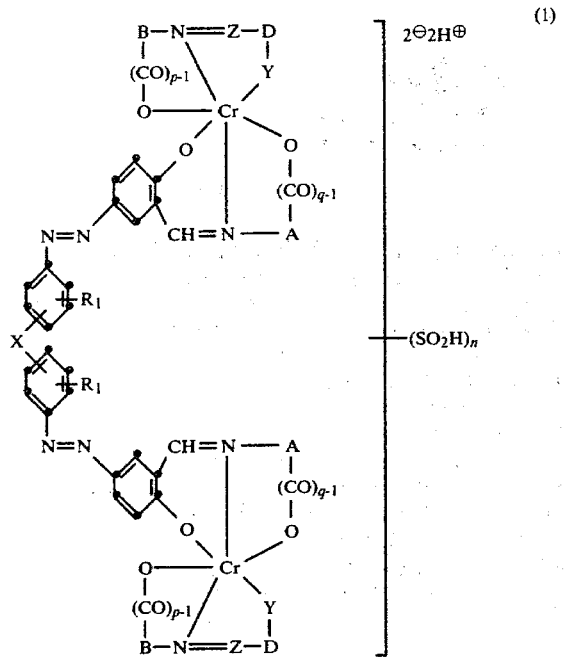

wherein X is a direct bond or a bridge member, Z is a nitrogen atom or a —CH—group, each of p and q is independently 1 or 2, Y is an oxygen atom or a group of the formula —NR—, wherein R is hydrogen or a low molecular alkyl radical, with the proviso that, if Z is a CH group, Y must be an oxygen atom, $R_1$ is hydrogen or a substituent, B is a benzene or naphthalene radical, D is the radical of an o-hydroxyaldehyde and, if Z is the —CH—group or if Z is a nitrogen atom, D is the radical of a coupling component which couples in the ortho-position to Y, n is an integer from 2 to 8, preferably from 2 to 6, and A is a benzene or naphthalene radical or a substituted or unsubstituted aliphatic or cycloaliphatic radical, with the proviso that q must be 2 if A is an aliphatic or cycloaliphatic radical.

A bridge member X can be in particular a methylene bridge which is unsubstituted or substituted by low molecular alkyl, for example —CH₂—, —C(CH₃)₂—,

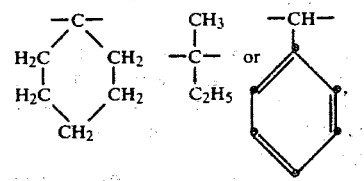

or a bridge member of the formula —O—, —S—, —NR'—, —SO—, —SO₂—, —CO—, —CO—CO—, —CO—NH—, —NH—CO—NH—, —NH—CO—S—NH—, —SO₂NH—, —SO₂—NH—SO₂—, —N=N—, —CH₂—CH₂— or —CH=CH—, wherein R' is hydrogen or low molecular alkyl.

In addition to hydrogen, the radical $R_1$ can be in particular the sulfo and carboxyl group, halogen, especially chlorine, and low molecular alkyl or alkoxy.

Throughout this specification, the term "low molecular" denotes radicals containing 1 to 5 carbon atoms. The radicals B can carry one or more sulfo groups and, in addition, be further substituted, for example by low molecular alkyl, alkoxy, alkylsulfonyl, sulfonamido, low molecular N-alkylsulfonamido or N,N-dialkylsulfonamido, chlorine, bromine, nitro, cyano, arylazo, especially phenylazo, sulfophenylazo or sulfonaphthylazo and arylazoarylene-azo, such as sulfophenylazophenylene-azo or sulfonaphthylazophenylene-azo.

The radical —D—Y— is derived in particular from the following coupling components: phenols, naphthols, naphthylamines, pyrazolones, pyrazolimines, pyridones and acetoacetamides, especially acetoacetanilides, and barbituric acid derivatives and oxyquinolines.

The radicals A have either one of the meanings of B or they are derived from aliphatic or cycloaliphatic amino acids. In this latter case, q must be 2 and A is preferably a substituted or unsubstituted alkylene radical, an alkenylene or a cycloalkylene radical. An alkylene radical A contains preferably 1 to 11 carbon atoms and possible substituents are the hydroxyl, methylmercapto, methylsulfonyl or sulfo group, aryl radicals, in particular phenyl or substituted phenyl, for example hydroxyphenyl or phenyl which is substituted by low molecular alkyl or alkoxy, and finally heterocyclic radicals, such as imidazolyl or indolyl. An alkenylene radical A is for example the vinylene radical or the phenylvinylene radical. A cycloalkylene radical is in particular the cyclohexylene radical.

The α- and β-amino acids are particularly preferred, i.e. A is preferably a substituted or unsubstituted methylene or ethylene radical. Suitable amino acids are described, for example, in Greenstein and Winitz, Chemistry of Amino Acids, Wiley (1961). In particular, the invention relates to compounds of the formula (1), wherein Y is an oxygen atom or the —NH—group, and, most particularly, to chromium complexes which, in the form of the free acid, have the formula

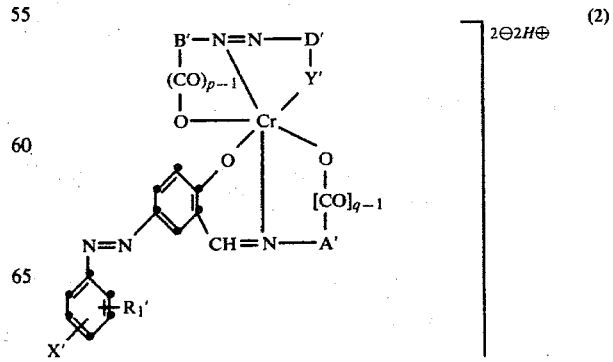

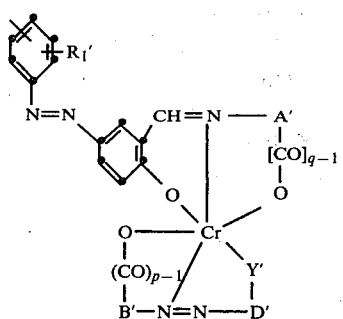

wherein X' is a direct bond or a bridge of the formula

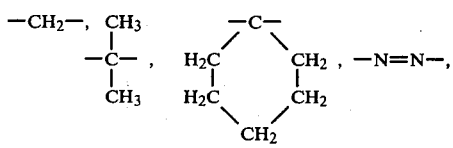

—CH=CH—, —SO$_2$— or —SO$_2$—NH—SO$_2$—, Y' is an oxygen atom or the —NH— group, R$_1$' is hydrogen, the sulfo group, chlorine, methyl or methoxy, p is 1 or 2, q is 1 or 2, B' is a phenyl or naphthyl radical which is unsubstituted or substituted by sulfo, arylazo, alkyl or alkoxy groups, chlorine, bromine, nitro or cyano, and D' is a phenyl radical which is unsubstituted or substituted by hydroxyl, alkyl or alkoxy, a naphthyl radical which is unsubstituted or substituted by chlorine, acylamino or sulfo, the radical of a 1-aryl-3-methylpyrazol-5-one or the radical of an acetoacetanilide which is unsubstituted or substituted in the anilide nucleus by sulfo, nitro, chlorine, bromine, alkyl or alkoxy, and wherein A', if q is 1, has one of the meanings given for B' or, if q is 2, is an alkylene group which is unsubstituted or substituted, for example, by hydroxyl, methylmercapto, methylsulfonyl, sulfo, phenyl, hydroxyphenyl, imidazolyl or indolyl.

By alkyl and alkoxy are meant in this connection low molecular radicals. Acylamino denotes low molecular alkanoylamino, alkylsulfonylamino and alkoxycarbonylamino radicals and aroylamino and arylsulfonylamino radicals, whilst the term aryl embraces in particular naphthyl, naphthyl substituted by 1 to 3 sulfo groups and also in particular phenyl and phenyl which is substituted by chlorine, bromine, methyl, ethyl, methoxy, nitro or sulfo.

The compounds of the present invention are obtained by reacting a compound of the formula

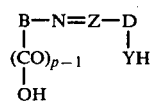

(3)

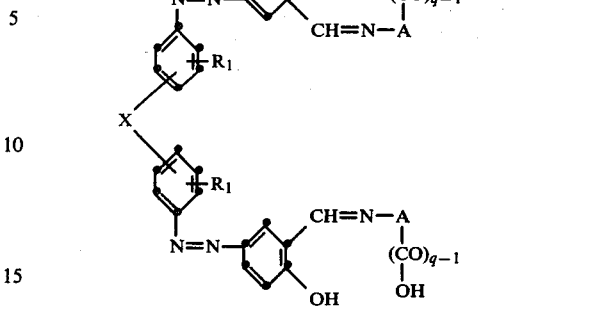

wherein R$_1$, X, Y, Z, A, B, D, p and q are as defined for formula (1), with a chromium donor to the 1:1 chromium complex or, in the case of the formula (4), to the chromium complex containing 2 atoms of chromium per molecule, and subsequently reacting this latter with the non-metallised compound of the formula (4) or (3), the starting materials being so chosen that they contain 2 to 8 sulfo groups.

The 1:1 chromium complex of the compound of the formula (3) is preferably prepared first and then reacted with the bisazomethine of the formula (4) in the ratio 2:1. Advantageously, this latter compound is prepared in the reaction mixture in situ. The procedure is that the 1:1 chromium complex of the compound of the formula (3) is reacted with a mixture of a dialdehyde of the formula

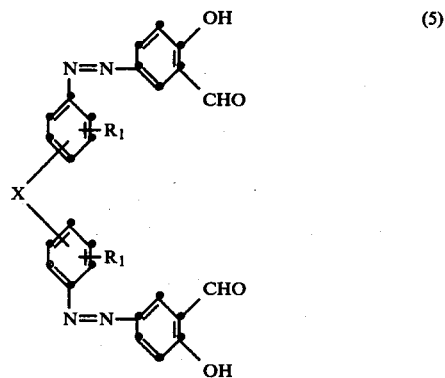

and 2 equivalents of an amine or an amino acid of the formula

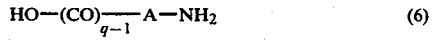

wherein X, R$_1$, q and A are as defined for formula (1).

A preferred group of the compounds of the present invention comprises those wherein X is a direct bond or a bridge member of the formula —SO$_2$—, —CH$_2$—, —CH=CH— or —O—.

Preferred compounds are also those of the formula (2), wherein the radicals R$_1$' represent hydrogen or sulfo, as these compounds are particularly easy to obtain.

Particularly interesting compounds are also those of the formulae (1) and (2), wherein Q is 2 and A and A' are aliphatic or cycloaliphatic radicals, in particular substituted or unsubstituted alkylene radicals.

If q is 2 in the compounds of the formula (2), A' is preferably a phenyl radical which is substituted by nitro or sulfo or nitro and sulfo.

The starting compounds of the formula (3) are obtained in conventional manner. If Z is a nitrogen atom, an amine of the formula

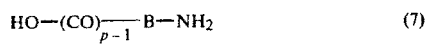  (7)

is diazotised and coupled to a coupling component of the formula

  (8)

Examples of suitable diazo components of the formula (7) are: anthranilic acid, 4- or-5-sulfo- and 4- or-5-sulfonamidoanthranilic acid, 2-amino-1-hydroxybenzene, 4-chloro- and 4,6-dichloro-2-amino-1-hydroxybenzene, 4- or 5-nitro-2-amino-1-hydroxybenzene, 4-chloro- and 4-methyl- and 4-acetylamino-6-nitro-2-amino-1-hydroxybenzene, 6-acetylamino- and 6-chloro-4-nitro-2-amino-1-hydroxybenzene, 4-cyano-2-amino-1-hydroxybenzene, 4-methoxy-2-amino-1-hydroxybenzene, 2-amino-1-hydroxybenzene-5-methyl- and -5-benzylsulfone, 2-amino-1-hydroxybenzene-4-methyl-, -ethyl-, -chloromethyl- and -butylsulfone, 5-nitro- and 6-nitro-2-amino-1-hydroxybenzene-4-methylsulfone, 2-amino-1-hydroxybenzene-4- or -5-sulfonamide, 2-amino-1-hydroxybenzene-4- or -5-sulfo-N-methyl- and -sulfo-N-β-hydroxyethylamide, 2-amino-1-hydroxybenzene-4-sulfanilide, 4-methoxy-5-chloro-2-amino-1-hydroxybenzene, 4-methyl-2-amino-1-hydroxybenzene, 4-chloro-5-nitro-2-amino-1-hydroxybenzene, 3,4,6-trichloro-2-amino-1-hydroxybenzene, 6-acetylamino-4-chloro-2-amino-1-hydroxybenzene, 4,6-dinitro-2-amino-1-hydroxybenzene, 4-nitro-2-amino-1-hydroxybenzene-6-sulfonamide, 2-amino-1-hydroxybenzene-4- or -5-sulfanthranilide, 2-amino-1-hydroxybenzene-4- or -5-sulfonic acid, 4-nitro-2-amino-1-hydroxybenzene-6-sulfonic acid, 5-nitro- or 6-nitro-2-amino-1-hydroxybenzene-4-sulfonic acid, 1-amino-2-hydroxynaphthalene-4-sulfonic acid, 1-amino-2-hydroxy-6-nitronaphthalene-4-sulfonic acid, 4-(4'- or 3'-sulfophenylazo)-2-amino--hydroxybenzene, 4-(3'-sulfonamidophenylazo)-2-amino-1-hydroxybenzene, 4-(4'-phenylazophenylazo)-2-amino-1-hydroxybenzene, 2-amino-1-hydroxybenzene-4,6-disulfonic acid.

Instead of the above amines of the formula (7), suitable diazo components are also corresponding methoxy compounds, such as anisidine, 4- or 5-chloroanisidine, 4- or 5-nitroanisidine or anisidine-4- or 5-sulfonic acid, the methoxy group being converted during the chroming into an OH group.

Particularly interesting compounds are those wherein B and B' are phenyl or naphthyl radicals which contain nitro and/or sulfo groups.

The radicals D and D' are derived in particular from the following groups of coupling components:

Naphthols which are unsubstituted or substituted by chlorine, acylamino, amino, sulfo, sulfonamido, N-monosubstituted or N,N-disubstituted sulfonamido groups and sulfone groups, said groups having the same meanings as given previously.

Naphthylamines which are unsubstituted or substituted by sulfo, sulfonamido, mono- or disubstituted sulfonamido or sulfone groups.

5-Pyrazolones or 5-aminopyrazolones which in position 1 preferably contain a phenyl or naphthyl radical which is unsubstituted or substituted by chlorine, nitro, low molecular alkyl and alkoxy groups, sulfonamido, N-alkylated sulfonamide groups, sulfone or, in particular, sulfo groups.

Acetoacetanilides and benzoylacetanilides which can be substituted in the anilide nucleus by chlorine, bromine, low molecular alkyl, alkoxy, sulfone, sulfonamido, N-monosubstituted or N,N-disubstituted sulfonamido groups.

Phenols which are substituted by low molecular acylamino groups and/or alkyl groups preferably containing 1 to 5 carbon atoms and which couple in the ortho-position.

2,6-Dihydroxy-3-cyano- or -carbamoyl-4-alkylpyridine and 6-hydroxy-2-pyridones which in position 1 are substituted by low molecular substituted or unsubstituted alkyl, for example methyl, isopropyl, β-hydroxyethyl, β-aminoethyl or γ-isopropoxypropyl, and which in position 3 carry a cyano or carboxamido group and, in position 4, a low molecular alkyl group, in particular methyl.

Barbituric acid and barbituric acids which are substituted at the nitrogen atoms by low molecular alkyl or aryl, in particular phenyl. Dioxyquinolines.

Examples of such coupling components are:
2-naphthol, 1,3- or 1,5-dihydroxynaphthalene, 2-naphthol-6-β-hydroxyethylsulfone, 1-naphthol, 1-acetylamino-7-naphthol, 1-propionylamino-7-naphthol, 1-carbomethoxyamino-7-naphthol, 1-carboethoxyamino-7-naphthol, 1-carbopropoxyamino-7-naphthol, 1-dimethylaminosulfonyl-amino-7-naphthol, 6-acetyl-2-naphthol, 2-naphthol-3-, -4-, -5-, -6-, -7- or -8-sulfonic acid, 1-naphthol-3-, -4- or -5-sulfonic acid, 4-methyl-1-naphthol, 4-methoxy-1-naphthol, 4-acetyl-1-naphthol, 1-naphthol-3-, -4- or -5-sulfonamide, 2-naphthol-3-, -4-, -5-, -6-, -7- or -8-sulfonamide, 5,8-dichloro-1-naphthol, 5-chloro-1-naphthol, 2-naphthylamine, 2-naphthylamine-1-sulfonic acid, 1-naphthylamine-4- or -5-sulfonic acid, 2-aminonaphthalene-7-sulfonic acid, 1-naphthylamine-4-sulfonamide, 2-aminonaphthalene-6-sulfonamide, 2-phenylaminonaphthalene,2-(3'-chlorophenyl)-aminonaphthalene, 2-aminonaphthalene-6-sulfonic acid N-methylamide or -6-sulfonic acid, 1,3-dimethylpyrazol-5-one, 3-methylpyrazol-5-one, 1-phenyl-3-methylpyrazol-5-one, 1-phenyl-5-pyrazolone-3-carbamoyl, 1-(2'-, 3' or 4'-methylphenyl)-3-methylpyrazol-5-one, 1-[3'- or 4'-(β-hydroxyethylsulfonyl)-phenyl]-3-methylpyrazol-5-one, 1-(2', 3'- or 4'-sulfophenyl)-3-methylpyrazol-5-one, 1-(2'-chloro-5'-sulfophenyl)-3-methylpyrazol-5-one, 1-(2'- or 4'-methoxyphenyl)-3-methylpyrazol-5-one, 1-(2'-, 3'- or 4'-chlorophenyl)-3-methylpyrazol-5-one, 1-(2'-, 3'- or 4'-nitrophenyl)-3-methylpyrazol-5-one, 1-(2'-, 5'- or 3'-, 4'-dichlorophenyl)-3-methylpyrazol-5-one, 1-(2'-, 3'- or 4'-sulfamoylphenyl)-3-methylpyrazol-5-one, 1-(2', 5'-dichloro-4'-sulfophenyl)-3-methylpyrazol-5-one, 1-(2'-, 3'- or 4'-methylsulfonylphenyl)-3-methylpyrazol-5-one, 1-(2'-, 3'- or 4'-sulfophenyl)-3-methyl-5-aminopyrazole, 1-(2'-chloro-5'-sulfophenyl)-3-methyl-5-aminopyrazole, acetoacetanilide, acetoacetanilide-4-sulfonic acid, acetoacet-o-anisidide, acetoacet-o-toluidide, acetoacet-o-chloroanilide, acetoacetanilide-3 or -4-sulfonamide, acetoacet-m-xylidide, tetralole, 4-methylphenol, 3-dialkylaminophenol, in particular 3-dimethylamino and 3-diethylaminophenol, 4-butylphenol, 4-amylphenol, in particular 4-t-amylphenol, 2-isopropyl-4-methylphenol, 2- or 3-acetylamino-4-methylphenol, 2-methoxycaronylamino-4-methylphenol, 2-ethoxycarbonylamino-4-methylphenol and 3,4-dimethylphenol, resorcinol, 2,6-dihydroxy-3-cyano-4-methylpyridine, 1-methyl-3-cyano-4-ethyl-6-hydroxypyridone, 1-amino-3-cyano-4-methyl-6-hydroxypyridone, 1-phenyl-3-carbamoyl-4-methyl-6-hydroxypyridone, barbituric acid, 2,4-dihydroxyquinoline.

Preferably, D and D' are naphthyl radicals which are unsubstituted or substituted by sulfo or amino and sulfo, or phenyl radicals which are unsubstituted or substituted by low molecular alkyl.

If Z is a —CH— group, an amine of the formula (7) is reacted with an o-hydroxybenzaldehyde or o-hydroxynaphthaldehyde. Examples of suitable aldehydes are: 2-hydroxy-1-naphthaldehyde, 1-hydroxy-2-naphthaldehyde, 2-hydroxybenzaldehyde, 3- and 5-methyl-2-hydroxybenzaldehyde, 3,5-dimethyl-2-hydroxybenzaldehyde, 5-butyl-2-hydroxybenzaldehyde, 5-chloro- or 5-bromo-2-hydroxybenzaldehyde, 3-chloro-2-hydroxybenzaldehyde, 3,5-dichloro-2-hydroxybenzaldehyde, 5-sulfo-2-hydroxybenzaldehyde, 3-methyl-5-chloro-2-hydroxybenzaldehyde and the aldehyde derivatives thereof which are substituted by arylazo or arylazoarylene-azo.

The dialdehydes of the formula (5) are obtained by tetraazotising a diamine of the formula

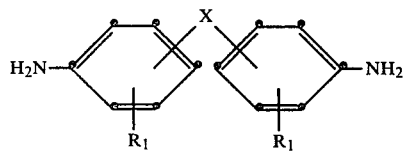
(9)

and coupling the resulting intermediate to 2 equivalents of salicylaldehyde.

Examples of suitable diamines of the formula (9) are: 4,4'-diaminodiphenyl, 2,2'-diaminodiphenyl-4,4'-disulfonic acid, 4,4'-diaminodiphenyl-3-sulfonic acid, 4,4'-diaminodiphenyl-2,2'- or 3,3'-disulfonic acid, 4,4'-diamino-3,3'-dimethoxydiphenyl, 4,4'-diamino-3,3'- or 2,2'-dimethyldiphenyl, 3,3'- or 4,4'-diaminodiphenylsulfone, 4,4'-diaminobenzophenone, 4,4'-diaminodiphenyl ether, 4,4'-diaminodiphenylsilfide, 4,4'-diaminodiphenylsulfoxide, 4,4'-diaminodiphenylamine, 4,4'-diaminodiphenyl-2-sulfonic acid, 4,4'-diaminobenzile, 3,3'- or 4,4'-diaminobenzanilide, 3,3'-diamino-benzanilide-4-sulfonic acid, 4,4'-diaminobenzanilide-3-sulfonic acid, 3,3'- or 4,4'-diaminodiphenyl urea, 4,4'-diaminodiphenyl urea-3,3'-disulfonic acid, 4,4'-diaminodiphenyl thiourea, 4,4'-diaminobenzene sulfanilide, 3,3'- or 4,4'-diaminodiphenyldisulfimide, 4,4'-dichloro-3,3-diaminodiphenyldisulfimide, 4,4'-diaminoazobenzene, 4,4'-diaminostilbene-2,2'-disulfonic acid, 4,4'-diamino-diphenylmethane, 4,4'-diamino-3,3'-dimethyldiphenylmethane, 3,3'-diamino-4,4'-dimethyldiphenylmethane, 4,4'-diaminotriphenylmethane, 4,4'-diaminodiphenylethane, 4,4'-diamino-3,3'-dimethyldiphenylethane, 2,2-bis-(4'-aminophenyl)-propane, 1,1-bis-(4'-aminophenyl)-cyclohexane and 1,1-bis-(4'-amino-3'-methylphenyl)-cyclohexane.

The bisazomethine is prepared by condensing the dialdehyde of the formula (5) with 2 equivalents of an amine or of an amino acid of the formula (6). Suitable compounds of the formula (6) are, on the one hand, the same aromatic amines as cited in connection with the diazo components of the formula (7), and, on the other hand, aliphatic or cycloaliphatic amino acids.

Examples of such amino acids are: glycine, α-alanine, β-alanine, 4-aminobutyric acid, 5-aminovaleric acid, 6-aminocapronic acid, 7-aminoheptanoic acid, 8-aminocaprylic acid, 11-aminoundecanoic acid, 12-aminolauric acid, serine, 5-benzylcysteine, phenylglycine, phenylalanine, norleucine, norvaline, leucine, lysine, methionine, methioninesulfone, threonine, histidine, tryptophane, tyrosine, 2-aminocyclohexanecarboxylic acid.

It is advantageous not to isolate the bisazomethane, but to prepare it in situ in the same reaction mixture in which it is added to the 1:1 chromium complex of the compound of the formula (3).

Particularly preferred amino acids of the formula (6) are glycine and α- and β-alanine. Preferred aromatic amines of the formula (6) are in particular those wherein q is 1 and A is a phenylene radical which is substituted by nitro and/or sulfo.

Preferably the starting products are so chosen that the resulting complex contains 2 to 6 sulfo groups.

The manufacture of the 1:1 chromium complex of the compound of the formula (3) or (4) is carried out by conventional methods which are known per se, for example by reacting said compound in an acid medium with a salt of trivalent chromium, for example chromium formiate, chromium sulfate, chromium chloride hexahydrate or chromium fluoride, at boiling temperature or, if appropriate, at temperatures exceeding 100° C. Trivalent chromium can also be obtained in the reaction mixture from chromium (VI) compounds, for example chromate, by simultaneously adding a reducing agent. The metallising can be carried out in an aqueous, aqueous-organic or in pure organic solvents, such as alcohols or ketones, with or without the addition of solution promoters or chroming catalysts.

The reaction of the 1:1 chromium complex of the compound of the formula (3) or (4) with the metal-free compounds of the formulae (4) or (3), and the reaction between a 1:1 chromium complex of a compound of the formula (3), an amine or an amino acid of the formula (6) and a dialdehyde of the formula (5), is advantageously carried out in a neutral to weakly alkaline medium, in an open or closed apparatus, at elevated temperature, for example at temperatures between 50° and 120° C.

The process can be carried out in organic solvents, for example alcohols or ketones or in an aqueous solution, in which case, if appropriate, the addition of solvents, for example of alcohols, formamide etc., can promote the reaction. It is usually advisable to react as far as possible equivalent amounts of the chromium-containing 1:1 complex and of the metal-free dye. An excess of metal-containing dye is usually less disadvantageous than one of metal-free dye.

Instead of using a homogeneous 1:1 chromium complex, it is also possible to use a mixture of different chromium complexes or a mixture of different dialdehydes and amines.

The chromium-containing mixed complexes of the present invention which are obtained by the above process are isolated with advantage in the form of their salts, in particular their alkali, for example lithium, salts, in particular sodium salts, or also ammonium salts. They are suitable for dyeing a very wide variety of polyamide materials, such as wool, synthetic polyamide fibres and, in particular, for dyeing leather. Depending on their constitution, they are also suitable for dyeing cellulosics, for example cotton and paper.

The compounds of the present invention are productive and have good covering power. They have a good exhaustion capacity while at the same time having good fastness properties, such as fastness to washing, water, perspiration, rubbing, diffusion, light and alkali. Their good build-up on different types of leather, both on pure chrome-tanned leather and on leather which has been retanned with vegetable or synthetic tannins, is to be particularly mentioned. Strong, orange or brown and olive shades are obtained.

The invention is illustrated by the following Examples, in which the parts and percentages are by weight unless otherwise indicated.

EXAMPLE 1

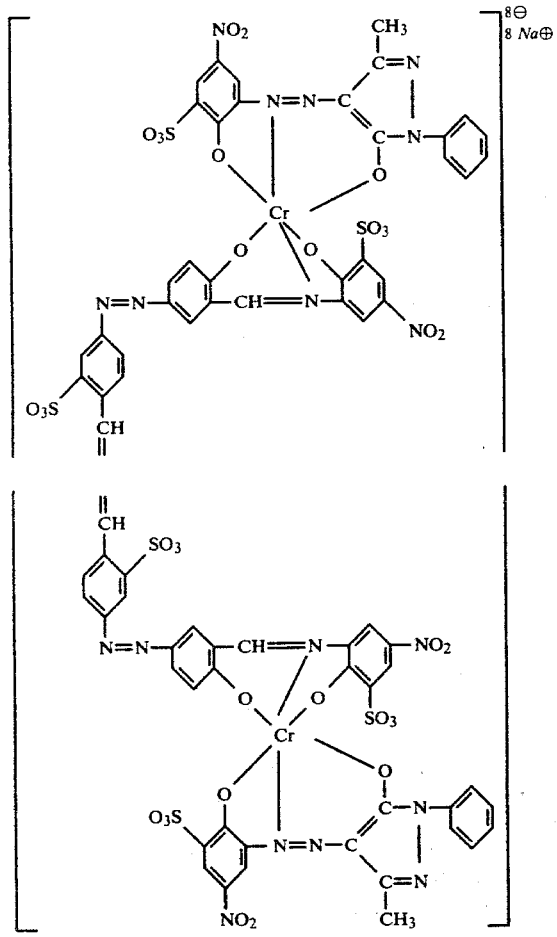

41.9 parts of the monoazo dye obtained from diazotised 4-nitro-2-amino-1-hydroxybenzene-6-sulfonic acid and 1-phenyl-3-methyl-5-pyrazolone are stirred with 26.7 parts of chromium chloride hexahydrate in 750 parts by volume of ethylene glycol at 120°–125° C. until the starting material can no longer be detected. Then 23.4 parts of 4-nitro-2-amino-1-hydroxybenzene-6-sulfonic acid and 31.8 parts of the coupling product obtained from tetraazotised 4,4'-diaminostilbene-2,2'-disulfonic acid and salicylaldehyde are added at 80°–85° C. to the resulting solution of the 1:1 chromium complex and the reaction mixture is kept at this temperature until the addition is complete. The pH of the reaction mixture is adjusted to 7–7.5 by addition of 5 N sodium hydroxide and kept thereat. The chromium-containing dye is precipitated by adding saturated sodium chloride solution, collected by filtration and cautiously dried.

The product is a dark powder which dissolves in water to give an orange solution and dyes leather in orange shades of good general fastness properties.

EXAMPLE 2

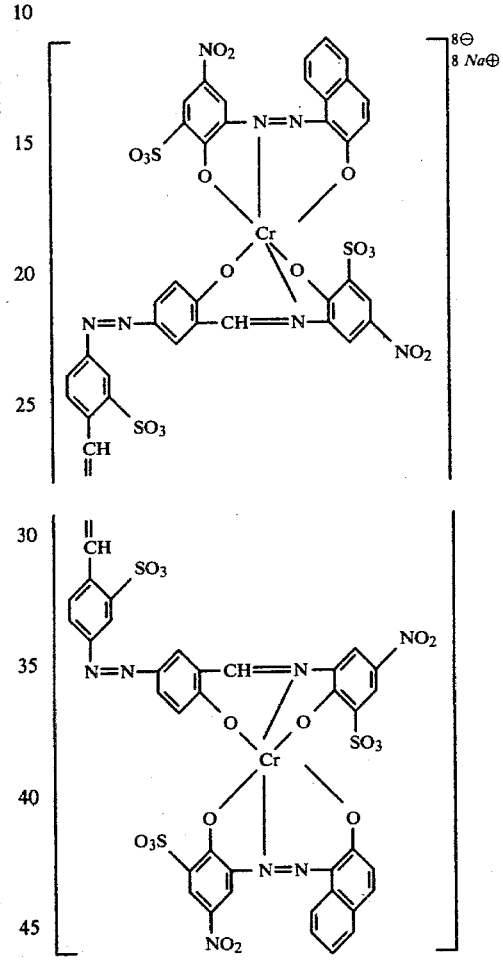

43.9 parts of the 1:1 chromium complex corresponding to 5.2 parts of chromium and 38.9 parts of the monoazo dye obtained from diazotised 4-nitro-2-amino-1-hydroxybenzene-6-sulfonic acid and 2-hydroxynaphthalene are suspended in 1000 parts by volume of water with 23.4 parts of 4-nitro-2-amino-1-hydroxybenzene-6-sulfonic acid and 31.8 parts of the disazo dye obtained from 4,4'-diaminostilbene-2,2'-disulfonic acid and salicylaldehyde. The reaction mixture is heated to 80°–85° C. while simultaneously raising the pH of the suspension to 7–7.5 with 5 N sodium hydroxide and is kept at this temperature and at constant pH with further 5 N sodium hydroxide until the starting materials can no longer be detected. The chromium-containing dye is precipitated with sodium chloride, collected by filtration, washed with dilute sodium chloride solution and dried, yielding a dark powder which dissolves in water to form a brown solution and colours leather in brown shades of good general fastness properties.

EXAMPLE 3

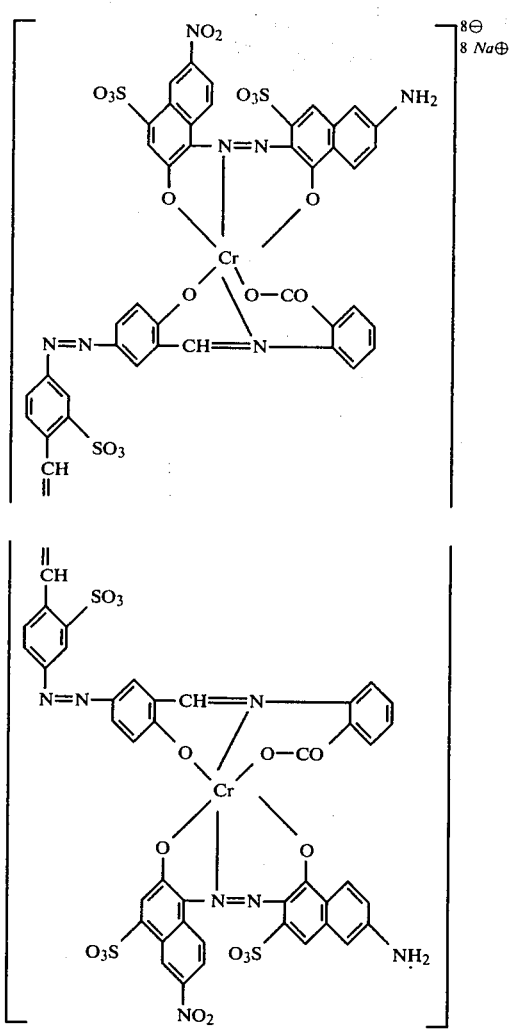

58.4 parts of the 1:1 chromium complex corresponding to 5.2 parts of chromium and 53.4 parts of the monoazo dye obtained from diazotised 6-nitro-1-amino-2-hydroxynaphthalene-4-sulfonic acid and 2-amino-5-hydroxynaphthalene-7-sulfonic acid, 13.7 parts of 2-aminobenzoic acid and 31.8 parts of the disazo dye obtained from 4,4'-diaminostilbene-2,2'-disulfonic acid and salicylaldehyde are suspended in 750 parts by volume of water. The mixture is then heated to 80°–85° C. while raising the pH of the suspension to 7–7.5 with 5 N sodium hydroxide and is kept at this temperature and at constant pH with further 5 N sodium hydroxide until the starting materials can no longer be detected. The chromium-containing dye is then precipitated with sodium chloride, collected by filtration and dried, yielding a dark powder which dissolves in water to give an olive solution and dyes leather in olive shades.

EXAMPLE 4

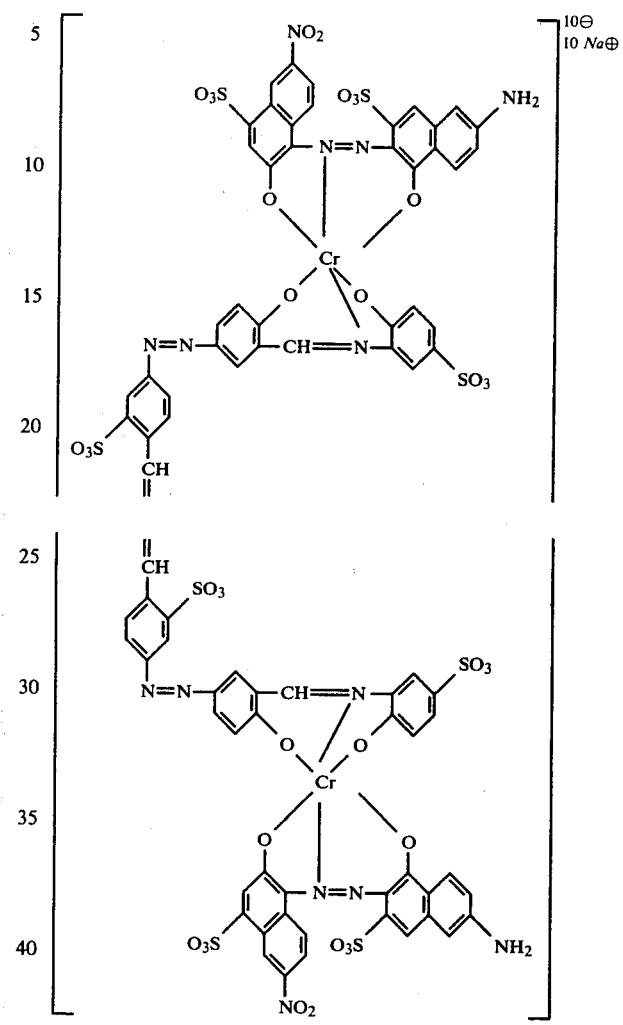

58.4 parts of the 1:1 chromium complex corresponding to 5.2 parts of chromium and 53.4 parts of the monoazo dye obtained from diazotised 6-nitro-1-amino-2-hydroxynaphthalene-4-sulfonic acid and 2-amino-5-hydroxynaphthalene-7-sulfonic acid, 18.9 parts of 2-amino-1-hydroxybenzene-4-sulfonic acid and 31.8 parts of the disazo dye obtained from 4,4'-diaminostilbene-2,2'-disulfonic acid and salicylaldehyde are suspended in 750 parts by volume of water. The mixture is then heated to 80°–85° C. while raising the pH of the solution to 7–7.5 with 5 N sodium hydroxide and is kept at this temperature and at constant pH with further 5 N sodium hydroxide until the starting materials can no longer be detected. The chromium-containing dye is isolated by concentrating the solution, and then dried. It is a dark powder which dyes leather from an acid bath in brown shades of good general fastness properties.

Table I lists further dyes having similar properties which are obtained by reacting the 1:1 chromium complex of the compounds in column III with the amines of column II and the aldehydes of column I. Column IV indicates the shade in which these dyes colour leather.

TABLE I

| No. | I | II | III | IV |
|---|---|---|---|---|
| 1 | 4,4'-bis[(2-hydroxy-4-formylphenyl)azo]stilbene-2,2'-disulfonic acid | 2-aminophenol | 2-hydroxy-3-sulfo-5-nitrophenyl-N=CH-(2-hydroxyphenyl) | yellowish orange |
| 2 | " | 2-amino-4-chlorophenol | " | yellowish orange |
| 3 | " | 2-amino-3-sulfo-5-nitrophenol (HO₃S, HO, NH₂, NO₂) | 3-hydroxy-5-nitrophenyl-N=N-(2-amino-6-sulfonaphthyl) | brown |
| 4 | " | 2-amino-4-nitrophenol | 1-hydroxy-4-sulfo-6-nitronaphthyl-N=N-(2-hydroxynaphthyl) | brown |
| 5 | " | 2-amino-3-sulfo-5-nitrophenol | 2-hydroxy-4-sulfo-6-nitronaphthyl-N=N-(2-hydroxynaphthyl) | brown |
| 6 | " | 2-amino-4-chlorobenzoic acid (COOH, NH₂, Cl) | 2-hydroxy-3-sulfo-5-nitrophenyl-N=N-pyrazolone (C=N, CH₃, OH, N-phenyl) | brown |
| 7 | " | 2-amino-4-nitrophenol | 2-hydroxy-4-sulfo-6-nitronaphthyl-N=N-(1-hydroxy-2-sulfo-6-aminonaphthyl) | olive-brown |

TABLE I-continued

| No. | I | II | III | IV |
|-----|---|----|-----|----|
| 8 | " | " | (structure: bis-azo with two HO-naphthalene/phenyl groups and SO₃H) | brown |
| 9 | " | 2-amino-1-hydroxy-3-sulfo-5-nitrobenzene (HO₃S, HO, NH₂, NO₂) | " | brown |
| 10 | " | " | (structure: azo-naphthol with SO₃H-phenyl) | brown |
| 11 | " | anthranilic acid (COOH, NH₂) | (structure: pyrazolone azo with HO₃S, OH, NO₂, phenyl, CH₃) | orange |
| 12 | " | " | (structure: HO₃S, OH, NO₂ phenyl azo naphthol) | brown |
| 13 | (bis-azo diphenyl ether structure with CHO, OH groups) | 2-amino-1-hydroxy-4-sulfobenzene (OH, NH₂, SO₃H) | (structure: HO₃S, OH, NO₂ naphthol azo naphthol) | olive-brown |
| 14 | " | " | (structure: HO₃S, OH, NO₂ phenyl azo naphthol) | brown |

TABLE I-continued

| No. | I | II | III | IV |
|---|---|---|---|---|
| 15 | [structure: bis-azo compound with two salicylaldehyde groups linked via diphenyl sulfide] | " | " | brown |
| 16 | " | " | [structure: azo dye with naphthol, HO₃S, NO₂ and naphthol-OH] | olive-brown |
| 17 | [structure: bis-azo compound with two salicylaldehyde groups linked via diphenyl-cyclohexylmethane] | [structure: 2-amino-1-hydroxy-4-sulfonic acid benzene] | " | olive-brown |
| 18 | [structure: bis-azo compound with two salicylaldehyde groups linked via 2,2-bis(4-phenyl)propane] | [structure: 3-amino-4-hydroxy-5-nitrobenzenesulfonic acid] | [structure: 2,2'-dihydroxy-5-nitro-5'-pentyl azobenzene] | brown |
| 19 | " | " | [structure: azo dye with HO₃S, OH, NO₂, OH, C₅H₁₁] | brown |
| 20 | " | " | [structure: azo dye with HO₃S, OH, NO₂, OH, C₄H₉] | brown |

TABLE I-continued

| No. | I | II | III | IV |
|---|---|---|---|---|
| 21 | [structure: bis-azo biphenyl disulfonic acid with CHO/OH substituents] | 2-aminobenzoic acid (anthranilic acid) | [structure: naphthalene azo naphthalene with HO, SO₃H, NO₂, NH₂ substituents] | greenish olive |
| 22 | " | 2-amino-4-(phenylazo)phenol | [pyrazolone azo structure with HO₃S, OH, NO₂, phenyl, CH₃] | orange |
| 23 | " | 3-amino-5-nitro-2-hydroxybenzenesulfonic acid | " | orange |
| 24 | " | anthranilic acid (COOH, NH₂) | " | orange |
| 25 | " | 2-amino-4-chlorophenol | [naphthalene azo naphthalene with HO, SO₃H, NO₂, OH] | brown |
| 26 | " | anthranilic acid | " | brownish olive |
| 27 | " | 2-amino-4-nitrophenol | [naphthalene azo naphthalene with HO₃S, HO, HO₃, NH₂, NO₂] | olive |
| 28 | " | " | [pyrazolone azo structure with HO₃S, HO, NO₂, OH, phenyl, CH₃] | orange |
| 29 | " | " | [structure with HO, NH₂, O₂N, SO₃H naphthyl azo] | olive |

TABLE I-continued

| No. | I | II | III | IV |
|---|---|---|---|---|
| 30 | (bis-azo bisaldehyde structure) | 3-amino-2-hydroxy-5-nitrobenzenesulfonic acid | pyrazolone azo structure with 2-hydroxy-4-nitrophenyl and 3-sulfophenyl | reddish orange |
| 31 | " | " | pyrazolone azo structure with 2-hydroxy-3-sulfo-5-nitrophenyl and phenyl | reddish orange |
| 32 | (bis-azo bisaldehyde with CH(phenyl) bridge) | 3-amino-2-hydroxy-5-nitrobenzenesulfonic acid | 1-(2-hydroxy-3-sulfo-5-nitrophenylazo)-2-naphthol | brown |
| 33 | " | 2-amino-6-nitro-phenol-4-sulfonic acid | " | brown |
| 34 | (bis-azo bisaldehyde with SO₂ bridge) | 3-amino-2-hydroxy-5-nitrobenzenesulfonic acid | pyrazolone azo structure with 2-hydroxy-3,5-disulfophenyl and 3-chlorophenyl | orange |
| 35 | " | " | 1-(2-hydroxy-3-sulfo-5-nitrophenylazo)-2-naphthol | brown |

TABLE I-continued

| No. | I | II | III | IV |
|---|---|---|---|---|
| 36 | 4-[(4-{[4-((E)-2-{4-formyl-3-hydroxyphenyl}diazen-1-yl)phenyl]methyl}phenyl)diazenyl]-2-hydroxybenzaldehyde structure (bis-azo with CH₂ bridge, CHO/OH groups) | 2-aminobenzoic acid (anthranilic acid) | 1-[(2-hydroxynaphthalen-1-yl)diazenyl]-6-nitro-3-sulfo-2-naphthol structure | olive |
| 37 | " | 2-amino-4-nitrophenol | " | olive brown |
| 38 | bis-azo structure with SO₂-NH-SO₂ bridge, CHO/OH groups | 3-amino-5-nitro-2-hydroxybenzenesulfonic acid | " | olive brown |
| 39 | " | " | phenylpyrazolone coupled with sulfo/nitro hydroxyphenyl diazo structure | orange |
| 40 | bis-azo structure with urea (NH-CO-NH) bridge, SO₃H and CHO/OH groups | 2-aminobenzoic acid | 1-[(2-hydroxynaphthalen-1-yl)diazenyl]-6-nitro-4-sulfo-2-naphthol structure | olive |
| 41 | " | 3-amino-5-nitro-2-hydroxybenzenesulfonic acid | 1-[(2-hydroxy-4-nitrophenyl)diazenyl]-2-naphthol structure | brown |

TABLE I-continued

| No. | I | II | III | IV |
|---|---|---|---|---|
| 42 | (bisazo compound with two 4-hydroxy-3-formylphenyl-azo-phenyl groups linked by cyclohexyl-CH) | 2-amino-4-sulfo-phenol (HO, NH₂, SO₃H) | 1-(2-hydroxy-3-sulfo-5-nitrophenylazo)-2-hydroxynaphthalene | brown |
| 43 | " | " | (naphthyl-azo-naphthyl with OH, SO₃H, NO₂, NH₂ substituents) | olive |
| 44 | (bisazo compound with –NH–CO– bridge) | anthranilic acid (COOH, NH₂) | 1-(2-hydroxy-4-sulfo-6-nitronaphthylazo)-2-hydroxynaphthalene | olive |
| 45 | " | " | (pyrazolone azo with HO₃S, NO₂, phenyl, CH₃) | orange |
| 46 | (bisazo compound with –CH₂–CH₂– bridge, 2× SO₃H) | " | " | olive |
| 47 | " | " | 1-(2-hydroxy-3-sulfo-5-nitrophenylazo)-2-hydroxynaphthalene | brown |

TABLE I-continued

| No. | I | II | III | IV |
|---|---|---|---|---|
| 48 | " | 2-amino-4-nitrophenol | 1-[(2-hydroxy-4-sulfo-6-nitronaphthalen-1-yl)azo]-2-hydroxynaphthalene | olive brown |
| 49 | " | " | 1-[(2-hydroxy-4-sulfo-6-nitronaphthalen-1-yl)azo]-2-hydroxy-3-sulfo-6-aminonaphthalene | olive |
| 50 | 4,4′-bis[(3-formyl-4-hydroxyphenyl)azo]diphenylsulfone | anthranilic acid (2-aminobenzoic acid) | 1-[(3-sulfo-2-hydroxy-5-nitrophenyl)azo]-2-hydroxynaphthalene | brown |
| 51 | " | " | 1-[(3-sulfo-2-hydroxy-5-nitrophenyl)azo]-2-hydroxy-3-sulfo-6-aminonaphthalene | olive |
| 52 | " | " | (3-sulfo-2-hydroxy-5-nitrophenyl)azo-1-phenyl-3-methyl-5-pyrazolone derivative | orange |
| 53 | " | 2-amino-6-nitro-4-sulfophenol | 1-[(3-nitro-2-hydroxy-5-sulfophenyl)azo]-2-hydroxynaphthalene | brown |
| 54 | " | " | 1-[(3-sulfo-2-hydroxy-5-nitrophenyl)azo]-2-hydroxynaphthalene | brown |
| 55 | " | 2-amino-4-nitro-6-sulfophenol | pyrazolone bis-azo dye with two (3-sulfo-2-hydroxy-5-nitrophenyl)azo-2-hydroxynaphthalene groups | brown |

TABLE I-continued
| No. | I | II | III | IV |
|---|---|---|---|---|
| 56 | " | " | | olive |
| 57 | " | " | | brown |
| 58 | " | " | | orange |
| 59 | " | " | | orange |
| 60 | " | " | | olive brown |
| 61 | " | " | | olive brown |
EXAMPLE 5
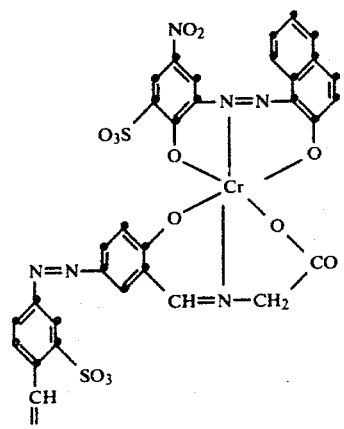
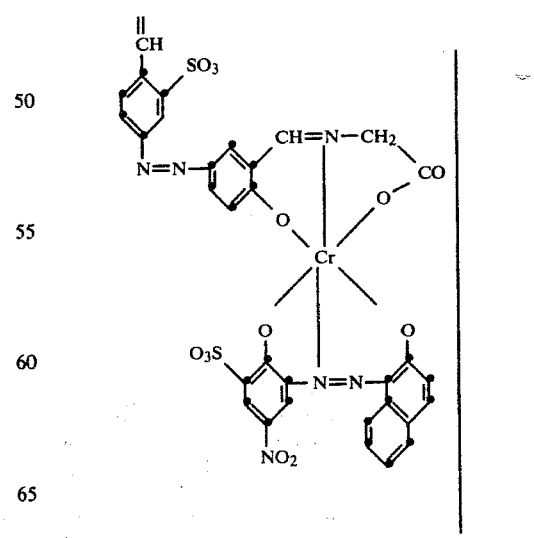

43.9 parts of the 1:1 chromium complex corresponding to 5.2 parts of chromium and 38.9 parts of the monoazo dye obtained from diazotised 4-nitro-2-amino-1-hydroxybenzene-6-sulfonic acid and 2-hydroxynaphthalene, 7.5 parts of glycine and 31.8 parts of the disazo dye obtained from 4,4'-diaminostilbene-2,2'-disulfonic acid and salicylaldehyde are suspended in 850 parts by volume of water. The reaction mixture is heated to 80°-85° C. while simultaneously raising the pH to 7-7.5 with 5 N sodium hydroxide and is kept at this temperature and at constant pH with further 5 N sodium hydroxide until the starting materials can no longer be detected. The chromium dye is precipitated with sodium chloride, collected by filtration, washed with dilute sodium chloride solution and dried, yielding a dark powder which dissolves in water to give a brown solution and dyes leather in brown shades of good general fastness properties.

EXAMPLE 6

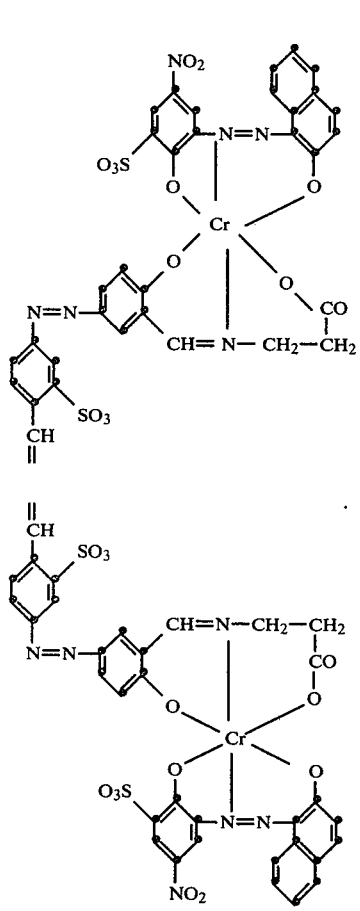

43.9 parts of the 1:1 chromium complex corresponding to 5.2 parts of chromium and 38.9 parts of the monoazo dye obtained from 4-nitro-2-amino-1-hydroxybenzene-6-sulfonic acid and 2-hydroxynaphthalene, 8.9 parts of β-alanine and 31.8 parts of the disazo dye obtained from 4,4'-diaminostilbene-2,2'-disulfonic acid and salicylaldehyde are suspended in 850 parts by volume of water. The reaction mixture is heated to 80°-85° C. while simultaneously raising the pH to 7-7.5 with 5 N sodium hydroxide and is kept at this temperature and at constant pH with further 5 N sodium hydroxide until the starting materials can no longer be detected. The chromium dye is precipitated with sodium chloride, collected by filtration, washed with dilute sodium chloride solution and dried, yielding a dark powder which dissolves in water to give a brown solution and dyes leather in brown shades of good fastness properties.

EXAMPLE 7

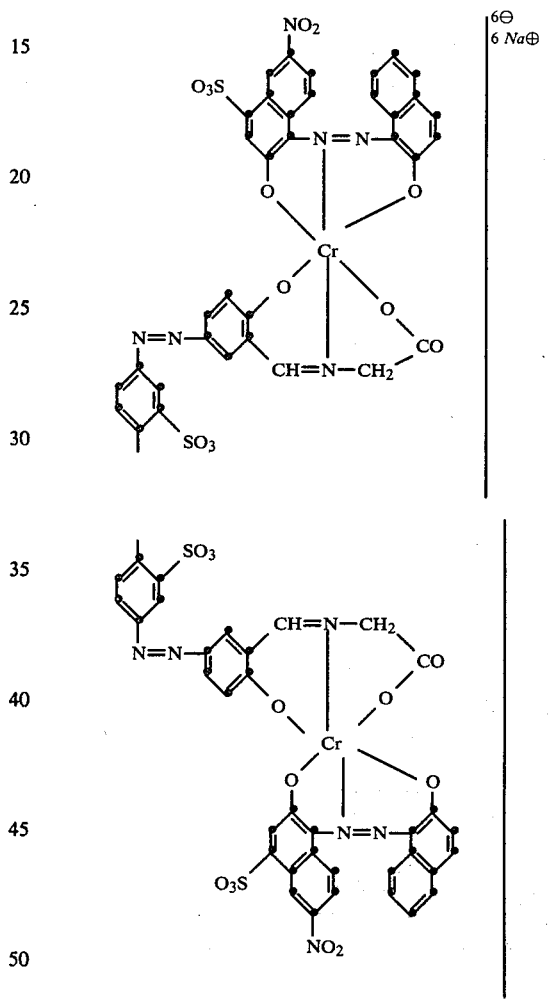

48.9 parts of the 1:1 chromium complex corresponding to 5.2 parts of chromium and 43.9 parts of the monoazo dye obtained from diazotised 6-nitro-1-amino-2-hydroxynaphthalene-4-sulfonic acid and 2-hydroxynaphthalene, 30.5 parts of the coupling product obtained from diazotised 4,4'-diaminodiphenyl-2,2'-disulfonic acid and salicylaldehyde and 7.5 parts of glycine are suspended in 850 parts of water. The mixture is heated to 80°-85° C. while simultaneously raising the pH of the suspension to 7-7.5 with 5 N sodium hydroxide and is kept at this temperature and at constant pH with further 5 N sodium hydroxide until the starting materials can no longer be detected. The chromium-containing dye is precipitated with sodium chloride, collected by filtration and dried, yielding a dark powder which dissolves in water to give an olive solution and dyes leather in olive shades.

Table II lists further dyes with similar properties which are obtained by reacting the 1:1 chromium complexes of the compounds of column III with the amino acids of column V and the aldehydes of column I. The shades in which these dyes colour leather are indicated in column IV.

TABLE II

| No. | I | II | III | IV |
|---|---|---|---|---|
| 1. | [bis-azo stilbene disulfonic acid dialdehyde structure] | COOH–CH$_2$–NH$_2$ | [2,2'-dihydroxy-sulfo-nitro azonaphthalene structure] | brown |
| 2. | " | " | [hydroxy-nitro-phenylazo pyrazolone with sulfophenyl structure] | orange |
| 3. | " | COOH–CH(CH$_3$)–NH$_2$ | " | orange |
| 4. | " | COOH–CH$_2$–NH$_2$ | [sulfo-hydroxy-nitro-phenylazo pyrazolone with phenyl structure] | orange |
| 5. | " | COOH–CH(CH$_3$)–NH$_2$ | " | orange |
| 6. | " | COOH–CH$_2$–NH$_2$ | [hydroxy-nitro-phenylazo aminonaphthalenesulfonic acid structure] | olive |
| 7. | " | COOH–CH(C$_6$H$_5$)–NH$_2$ | [sulfo-hydroxy-nitro-phenylazo hydroxynaphthalene structure] | brown |
| 8. | " | COOH–CH(CH(CH$_3$)$_2$)–NH$_2$ | " | brown |

TABLE II-continued

| No. | I | II | III | IV |
|---|---|---|---|---|
| 9. | " | HOOC-CH(NH₂)-CH₂-C₆H₅ | " | brown |
| 10. | [structure: bis-azo with CHO, OH groups linked by SO₂-NH-SO₂] | HOOC-CH(NH₂)-CH₂ (COOH, CH₂, NH₂) | " | olive-brown |
| 11. | " | HOOC-CH₂-CH₂-NH₂ (COOH, CH₂, CH₂—NH₂) | " | " |
| 12. | [structure with CHO, OH, SO₃H groups, bis-azo linked by CH₂-CH₂] | HOOC-CH₂-NH₂ (COOH, CH₂—NH₂) | [naphthol azo structure with HO₃S, NO₂, OH] | olive |
| 13. | " | " | [structure with HO₃S, OH, NO₂, azo to naphthol] | olive |
| 14. | [structure with CHO, OH, bis-azo linked by CH] | " | [pyrazolone azo structure with HO₃S, OH, NO₂, CH₃, phenyl] | orange |
| 15. | " | HOOC-CH₂-CH₂-NH₂ (COOH, CH₂, CH₂—NH₂) | " | " |

TABLE II-continued

| No. | I | II | III | IV |
|---|---|---|---|---|
| 16. | [structure: CHO/OH-substituted phenyl-N=N-phenyl-CH₂-phenyl-N=N-phenyl with OH/CHO] | COOH-CH₂-NH₂ | " | orange |
| 17. | " | COOH-CH₂-CH₂-NH₂ | " | orange |
| 18. | [structure: CHO/OH-phenyl-N=N-phenyl-SO₂-NH-phenyl-N=N-phenyl with OH/CHO] | COOH-CH-NH₂ | " | orange |
| 19. | " | COOH-CH₂-CH₂-NH₂ | " | " |
| 20. | [structure: CHO/OH-phenyl-N=N-phenyl-C(CH₃)₂-phenyl-N=N-phenyl with OH/CHO] | " | " | orange |
| 21. | " | COOH-CH₂-NH₂ | " | orange |

TABLE II-continued

| No. | I | II | III | IV |
|---|---|---|---|---|
| 22. | [structure: bis-azo stilbene with CHO, OH, SO₃H groups] | COOH–CH₂–CH₂–NH₂ | [structure: azo naphthol with HO₃S, NO₂] | brown |
| 23. | " | " | [structure: azo with OH, NO₂, NH₂, SO₃H] | olive |
| 24. | " | " | [structure: complex azo with OH, NO₂, SO₃H, CH₃] | orange |
| 25. | " | " | [structure: complex azo with HO₃S, OH, NO₂, CH₃] | orange |
| 26. | [structure: biphenyl bis-azo with CHO, OH, SO₃H groups] | COOH–CH₂–NH₂ | [structure: azo with HO₃S, OH, NO₂] | olive |
| 27. | " | COOH–CH₂–CH₂–NH₂ | " | brown |
| 28. | " | " | [structure: azo naphthol with HO₃S] | olive |
| 29. | " | COOH–CH₂–NH₂ | [structure: azo with OH, NO₂] | brown |
| 30. | " | COOH–CH(CH₃)–NH₂ | " | brown |

TABLE II-continued
| No. | I | II | III | IV |
|---|---|---|---|---|
| 31. | " |  | " | brown |
| 32. | " |  | 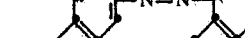 | olive-green |
| 33. | " |  | 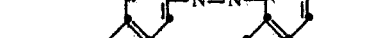 | orange |
| 34. | " |  | " | orange |
| 35. | " |  | 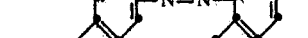 | orange |
| 36. | " |  | " | orange |
| 37. | 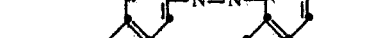 |  |  | orange |
| 38. | " | 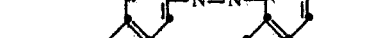 | " | orange |
| 39. |  | | " | orange |
| 40. | " | " | 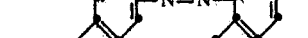 | orange |

TABLE II-continued

| No. | I | II | III | IV |
|---|---|---|---|---|
| 41. | " | " | [structure with OH, N=N, HO3S, NO2, naphthalene-OH] | olive-brown |
| 42. | " | " | [structure with HO3S, OH, N=N, NO2, OH naphthalene] | olive-brown |
| 43. | " | " | [structure with OH, N=N, HO3S, SO3H, NH2, NO2] | olive |
| 44. | " | " | [structure with HO3S, OH, N=N, NO2, OH naphthalene] | brown |
|  |  |  | [SO3H, OH, N=N-C, pyrazolone-phenyl structure with CH3] | brown |

DYEING PROCEDURE FOR LEATHER 100 parts of clothing velours leather (dry weight) are wet back at 50° C. for 2 hours in a solution of 1000 parts of water and 2 parts of 24% ammonia and subsequently dyed for 1 hour at 60° C. in a solution of 1000 parts of water, 2 parts of 24% ammonia and 6 parts of the dye of Example 7. A solution of 40 parts of water and 4 parts of 85% formic acid is then added and dyeing is continued for a further 30 minutes. The leather is then thoroughly rinsed and, if appropirate, treated for 30 minutes at 50° C. with 2 parts of a dicyandiamine/formaldehyde condensation product. Other kinds of velour leather as well as glove leather can be dyed in the same manner.

The resulting olive dyeings are distinguished by good fastness properties and good covering power.

A fast, brown dyeing is obtained in the same manner using the dye of Example 2.

What is claimed is:

1. A chromium complex compound which, in the form of the free acid, has the formula

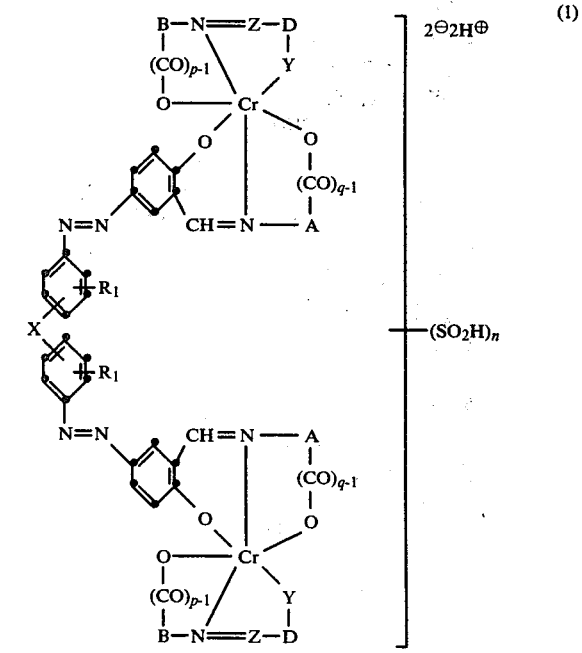

(I)

wherein X is a direct bond or a bridge member selected from the group consisting of methylene, methylene substituted by $C_1$- to $C_5$-alkyl, methylene substituted by phenyl, —O—, —S—, —NR'—, —SO—, —SO$_2$—, —CO—, —CO—CO—, —CO—HN—, —N-H—CO—NH, —NH—CS—NH—, —SO$_2$NH—, —SO$_2$—, —N=N—, —CH$_2$—CH$_2$— and —CH=CH—, wherein R' is hydrogen or $C_1$- to $C_5$-alkyl; Z is a nitrogen atom or a —CH— group; each of p and q is independently 1 or 2; Y is an oxygen atom or a group of the formula —NR—, wherein R is hydrogen or $C_1$ to $C_5$-alkyl, with the proviso that, if Z is a —CH— group, Y must be an oxygen atom; $R_1$ is hydrogen, sulfo, carboxy, halogen, $C_1$- to $C_5$-alkyl or $C_1$- to $C_5$-alkoxy; B is a benzene or naphthalene radical; D is the radical of an o-hydroxy-aldehyde if Z is the —CH— group, or, if Z is a nitrogen atom, D is the radical of a coupling component which is selected from the group consisting of phenols, naphthols, naphthyl-amines, pyrazolones, pyrazolimines, pyridones, acetoacetamides, barbituric acids and oxyquinolines; n is an integer from 2 to 8; and A is a benzene or naphthalene radical or a substituted or unsubstituted aliphatic or cycloaliphatic radical, with the proviso that, if A is an aliphatic or cycloaliphatic radical, q must be 2.

2. A chromium complex compound of claim 1 of the formula (1), wherein D-Y is the radical of a phenol, naphthol, naphthylamine, pyrazolone, pyrazolimine, pyridone or of an acetoacetamide.

3. A chromium complex compound of claim 1 of the formula (1), wherein Y is an oxygen atom or the —NH— group and Z is a nitrogen atom.

4. A chromium complex compound of claim 1, of the formula

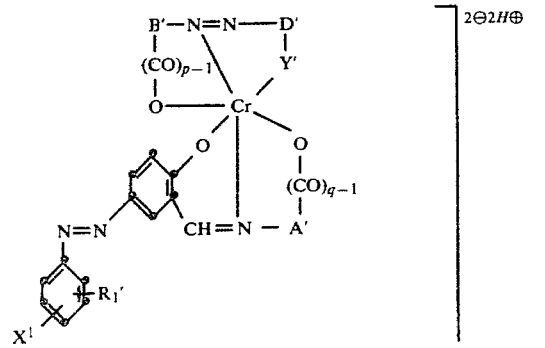
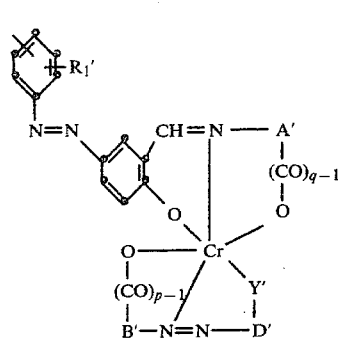

wherein X' is a direct bond or a bridge of the formula

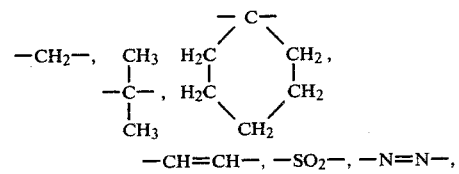

—CH=CH—, —SO$_2$—, —N=N—, or —SO$_2$—NH—SO$_2$,

Y' is an oxygen atom or the —NH— group, $R_1'$ is hydrogen, the sulfo group, chlorine, methyl or methoxy, p is 1 or 2, q is 1 or 2, B' is a phenyl or naphthyl radical which is unsubstituted or substituted by sulfo, arylazo, alkyl or alkoxy groups, chlorine, bromine, nitro or cyano, D' is a phenyl radical which is unsubstitued or substituted by hydroxyl, alkyl or alkoxy, a naphthyl radical which is unsubstituted or substituted by chlorine, acylamino or sulfo, the radical of a 1-aryl-3-methylpyrazol-5-one or the radical of an acetoacetanilide which is unsubstituted or substituted in the anilide nucleus by sulfo, nitro, chlorine, bromine, alkyl or alkoxy, and wherein A', if q is 1, has one of the meanings given for B' or, if q is 2, is an unsubstituted or substituted alkylene group.

5. A chromium complex compond of claim 4, wherein X' is a direct bond or a bridge member of the formula —SO$_2$—, —CH$_2$—, —CH=CH— or —O— which links both benzene nuclei in the para-position to the azo groups.

6. A chromium complex compound of claim 4, wherein $R_1'$ is hydrogen or sulfo.

7. A chromium complex compound of claim 4, wherein B' is phenyl or naphthyl which is substituted by nitro or sulfo or by nitro and sulfo.

8. A chromium complex compound of claim 4, wherein D' is a naphthyl radical which is unsubstituted or substituted by sulfo or by amino and sulfo, or is a phenyl radical which is unsubstituted or substituted by low molecular alkyl.

9. A chromium complex compound of claim 4, wherein q is 2 and A' is a methylene, ethylene or methylmethine group.

10. A chromium complex of claim 4, wherein q is 1 and A' is a phenyl radical which is substituted by nitro or sulfo or by nitro and sulfo.

11. A chromium complex compound of claim 1 which contains 2 to 6 sulfo groups.

* * * * *

UNITED STATES PATENT AND TRADEMARK OFFICE
CERTIFICATE OF CORRECTION

PATENT NO. : 4,256,633

DATED : March 17, 1981

INVENTOR(S) : Fabio Beffa

It is certified that error appears in the above—identified patent and that said Letters Patent is hereby corrected as shown below:

Face of the patent, Item [30] should read:

--April 25, 1978 [CH] Switzerland..........4448/78
  December 5, 1978 [CH] Switzerland........12396/78

Column 1, lines 37 and 44, in both occurrences, "-CH-" should read --CH--.

Claim 1, at Column 45, line 5 should read --substituted by $C_1$- to $C_5$-alkyl, methylene substituted by $C_5$-alkylene, methylene substituted by--;

Column 45, line 10, "-$SO_2$-" should read -- -$SO_2$-NH-$SO_2$- --;

Column 45, line 13, "-CH-" should read -- CH --;

Column 45, line 17, "-CH-" should read -- CH --.

*Signed and Sealed this*

*Twenty-second* Day of *December 1981*

[SEAL]

Attest:

GERALD J. MOSSINGHOFF

*Attesting Officer*   *Commissioner of Patents and Trademarks*